US012756474B2

(12) United States Patent
Ballance

(10) Patent No.: US 12,756,474 B2
(45) Date of Patent: Oct. 6, 2026

(54) BEAT-NOTE STABILIZED LASER WITH RECEIVED-POWER TRACKER

(71) Applicants: ColdQuanta, Inc., Boulder, CO (US); COLDQUANTA UK LIMITED, Oxford (GB)

(72) Inventor: Timothy George Ballance, Oxford (GB)

(73) Assignees: ColdQuanta, Inc., Boulder, CO (US); COLDQUANTA UK LIMITED (GB)

( * ) Notice: Subject to any disclaimer, the term of this patent is extended or adjusted under 35 U.S.C. 154(b) by 235 days.

(21) Appl. No.: 18/370,336

(22) Filed: Sep. 19, 2023

(65) Prior Publication Data

US 2024/0113788 A1 Apr. 4, 2024

Related U.S. Application Data

(60) Provisional application No. 63/412,766, filed on Oct. 3, 2022.

(51) Int. Cl.
*H04B 10/572* (2013.01)
*H04B 10/50* (2013.01)
*H04B 10/508* (2013.01)

(52) U.S. Cl.
CPC ......... *H04B 10/503* (2013.01); *H04B 10/508* (2013.01); *H04B 10/572* (2013.01)

(58) Field of Classification Search
CPC ............................ H04B 10/503; H04B 10/572
USPC .......................................... 398/195–196, 201
See application file for complete search history.

(56) References Cited

U.S. PATENT DOCUMENTS

| | | | | |
|---|---|---|---|---|
| 6,441,933 | B1 * | 8/2002 | Jang | H04B 10/07955 398/79 |
| 8,699,533 | B1 | 4/2014 | Wach | |
| 2003/0179791 | A1 * | 9/2003 | Hiroshi | H01S 5/0687 372/29.011 |
| 2005/0018724 | A1 * | 1/2005 | Da Silva | H01S 5/4006 372/32 |

(Continued)

FOREIGN PATENT DOCUMENTS

| | | |
|---|---|---|
| CN | 104795724 | 3/2016 |

OTHER PUBLICATIONS

Blumenthal et al. "Frequency-stabilized links for coherent WDM fiber interconnects in the datacenter." Journal of Lightwave Technology, vol. 38, No. 13, Jul. 1, 2020, pp. 3376-3386.

(Continued)

*Primary Examiner* — Li Liu
(74) *Attorney, Agent, or Firm* — Michael J. Attisha; Samuel Means; Greenberg Traurig, LLP

(57) ABSTRACT

A laser system provides a system output signal and a monitor signal with a predetermined phase and/or frequency relationship to the system output signal. The monitor signal is combined with a reference frequency to yield an optical beat-note. A telecom optical transceiver (e.g., an SFP or an SFP+ module) is used to convert the optical beat-note to an analog electrical beat-note. The transceiver can extract received-power information from the analog electrical beat-note and digitize the analog electrical beat-note to yield a digital electrical beat-note. The digital electrical beat-note can be used to stabilize the laser and the system output signal by phase or offset locking.

12 Claims, 4 Drawing Sheets

(56) References Cited

U.S. PATENT DOCUMENTS

| | | | | |
|---|---|---|---|---|
| 2009/0296751 | A1 * | 12/2009 | Kewitsch | H01S 5/042 372/18 |
| 2011/0135301 | A1 * | 6/2011 | Myslinski | H04Q 11/0066 398/34 |
| 2015/0185141 | A1 * | 7/2015 | Fermann | G01J 9/04 356/451 |
| 2020/0021082 | A1 * | 1/2020 | Rakuljic | H01S 5/4012 |
| 2025/0158708 | A1 * | 5/2025 | Masumoto | H04B 10/07955 |

OTHER PUBLICATIONS

Brodnik et al. “Chip-scale, optical-frequency-stabilized PLL for DSP-free, low-power coherent QAM in the DCI.” Optical Fiber Communication Conference, Optical Publishing Group, 2020.

* cited by examiner

BEAT-NOTE STABILIZED LASER WITH RECEIVED-POWER TRACKER

CROSS REFERENCE TO OTHER APPLICATIONS

This application claims priority to U.S. Provisional Patent Application No. 63/412,766 entitled USING TELECOM-GRADE OPTICAL TRANSCEIVER MODULES FOR OPTICAL BEAT NOTE DETECTION FOR LASER FREQUENCY STABILIZATION filed Oct. 3, 2022 which is incorporated herein by reference for all purposes.

BACKGROUND OF THE INVENTION

Lasers can generate light confined to a very narrow frequency band. However, the laser frequency can drift undesirably due to changes in power input, temperature, and other factors. Fortunately, there are well-established ways to stabilize the laser frequency. For example, a laser can be stabilized at a fixed frequency, e.g., by making adjustments to minimize deviations from resonance with a quantum transition. However, applying this approach to a tunable laser can be complex and expensive, e.g., due to the need to work with multiple atomic transitions.

However, one can couple an output of a tunable laser with a reference output of a stabilized reference laser to yield a difference signal, in effect, down converting the tunable output from optical frequencies to radio-frequency optical beat notes that a photodetector can convert to electrical beat notes. The electrical beat notes can be fed to a stabilizer input of a laser to phase lock or offset lock its output frequency. However, the beat note detectors used to convert the optical beat-notes and then digitize the resulting analog electrical beat-notes can be bulky and expensive. What is needed is a beat-note based stabilization approach for tunable lasers that meets increasing demand for lower cost and smaller size.

BRIEF DESCRIPTION OF THE DRAWINGS

Various embodiments of the invention are disclosed in the following detailed description and the accompanying drawings.

DETAILED DESCRIPTION

Figure 1:
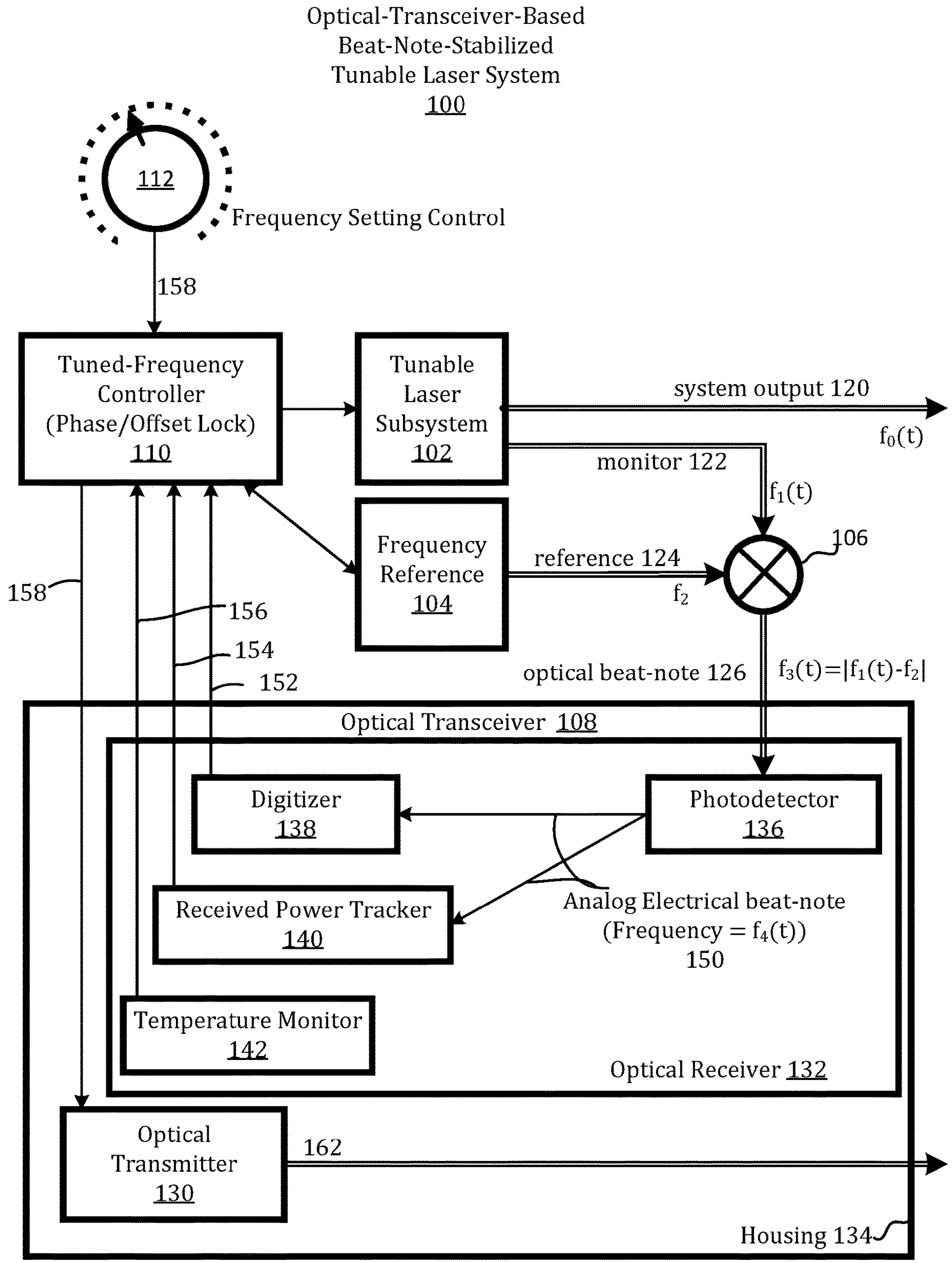
FIG. 1 is a schematic illustration of a beat-note stabilized laser system with received power tracking.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present invention provides a beat-note stabilized laser system in which beat-note detection and received-power tracking are provided within a single device. An obvious advantage is that the receive-power tracking can be helpful in diagnosing problems with the laser system. A surprising additional advantage is that size, weight, and power (SWaP) and costs of a laser system can be reduced due to economies of scale for such devices in contexts other than laser stabilization.

Thus, the present invention provides optical-transceiver-based stabilization of a tunable laser. For example, an embodiment uses a standard telecom optical transceiver that can convert optical beat-notes to digital electrical beat notes that can be used to stabilize lasers, e.g., through phase or offset locking. Telecom optical transceivers, including small form-factor pluggable (SFP) and enhanced small form factor pluggable (SFP+) modules, are designed for optical networking applications where cost and size are critical, and where markets are high volume. These devices have therefore been heavily optimized. Using optical transceiver modules for beat note detection therefore confers these cost, size, and functionality (e.g., built-in received-power monitoring) advantages to the field of laser frequency stabilization.

An optical-transceiver-based beat-note-stabilized tunable laser system 100, shown in FIG. 1, includes a tunable laser subsystem 102, a frequency reference 104, an optical coupler 106, an optical transceiver 108 (beat-note detector with received-power monitor), a tuned frequency controller 110, and a frequency setting control 112. Tunable laser subsystem 102 provides an optical output for laser system 100, having a frequency $f_0(t)$ that can vary over time t according to a frequency setting. In this embodiment, optical signals are transmitted along optical fibers. Other embodiments can include other optical transmission media.

In addition, tunable laser subsystem 102 outputs a monitor signal 122 having a variable frequency $f_1(t)$, which can be equal to or different from but having a predetermined (e.g., phase or frequency) relation with output frequency $f_0(t)$. For example, monitor signal 122 can be a frequency-shifted branch of system output 120. Alternatively, monitor 122 and system output signal 120 can be taken from different "teeth" of a frequency comb. Frequency reference 104 outputs a reference signal 124 with a reference frequency $f_2$. In system 100, frequency reference 104 includes a frequency comb so that the reference frequency is selectable; other embodiments can use a fixed reference frequency. For expository purposes, frequency $f_2$ is treated as constant.

Optical coupler 106 effectively functions as a downconverter in converting an optical-frequency monitor signal 122 into a radio-frequency optical beat-note 126 suitable for conversion to and processing within an electrical domain. To this end, optical coupler 106 combines monitor signal 122 and reference signal 124 to yield the optical beat-note 126 with frequency $f_3(t)$, where $f_3(t)=|f_1(t)-f_2,|$. Optical beat-note 126 can include optical components with optical frequencies $f_1(t)$, $f_2$ and $f_1(t)+f_2$ which are destined to be filtered out.

Optical transceiver 108 includes an optical transmitter 130 and an optical receiver 132, both enclosed by a housing 134. Optical receiver 132 includes a photodetector 136, a digitizer 138, a received-power tracker 140, and a temperature monitor 142. Photodetector 136 converts optical beat-note 126 to an analog electrical beat-note 150 of frequency $f_4(t)$, which is equal to $f_3(t)$. Optical frequency signal components $f_1(t)$, $f_2$, and $f_1+f_2$ are filtered out. Analog electrical beat-note 150 is input to digitizer 138, which outputs a digital electrical beat-note 152. Analog electrical beat-note 150 is also input to received-power tracker 140, which outputs a received power signal 154. In addition, temperature monitor 142 outputs a transceiver temperature signal 156.

Digital electrical beat-note 152, received-power signal 154, and transceiver temperature signal 156 are input to tuned frequency controller 110. Digital electrical beat-note 152 is input to a laser stabilization function of controller 110 to phase lock or offset lock (depending on the embodiment) tunable laser subsystem 102 and system output 120.

Any of digital electrical beat note 152, received-power signal 154, temperature signal 156, and data derived from these signals can be signaled using a local user interface and/or transmitted along electrical line 158 to optical transmitter 130. Optical transmitter 130 can convert the electrical input to an optical signal 160 to be transmitted along an optical fiber 162. Thus, optical transmitter 130 can connect laser system 100 to a management network 200, shown in FIG. 2A.

Figure 2A:
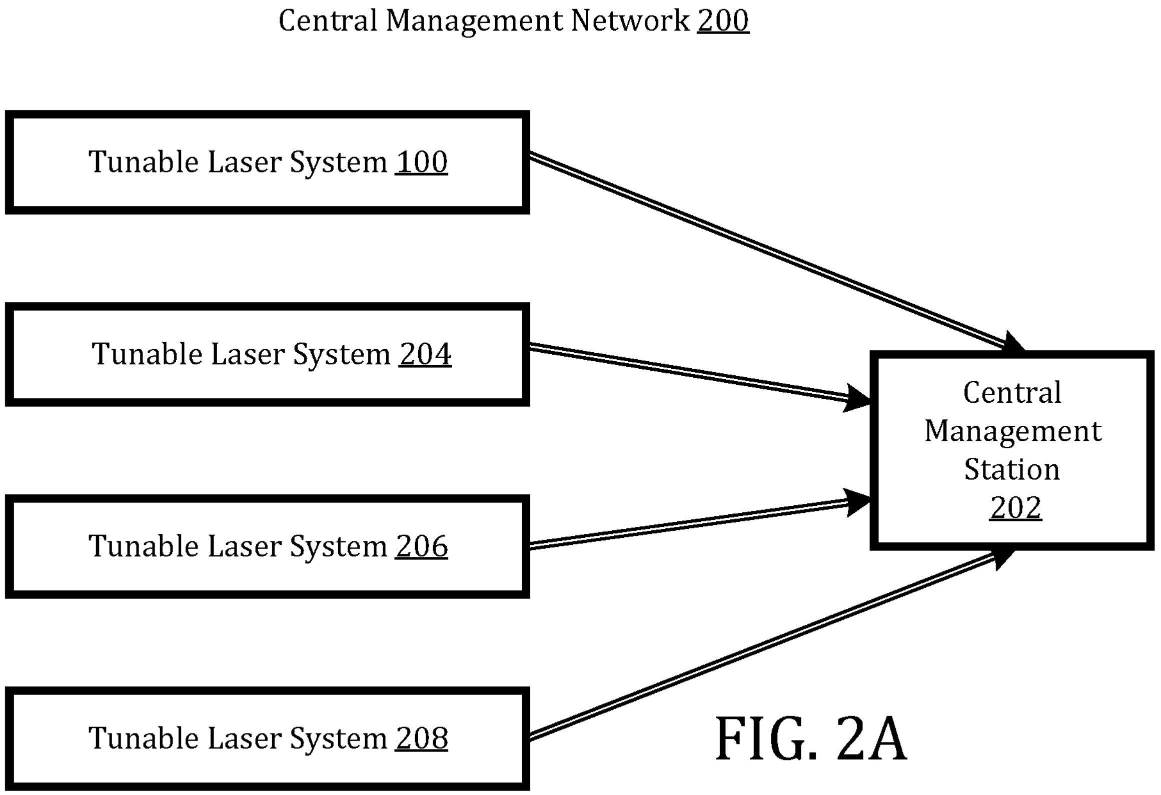
FIG. 2A is a schematic illustration of plural beat-note stabilized laser systems with received power tracking (including the beat-note stabilized tunable laser system of FIG. 1) monitored by a central management station.

As shown in FIG. 2A, a central management network 200 can include a central management station 202, tunable laser system 100, and other tunable laser systems 204, 206, and 208. These tunable laser systems can occupy, for example, diverse locations within an academic or corporate campus. Thus, one person or automated entity can monitor multiple distributed tunable laser systems from a single location.

Figure 2B:
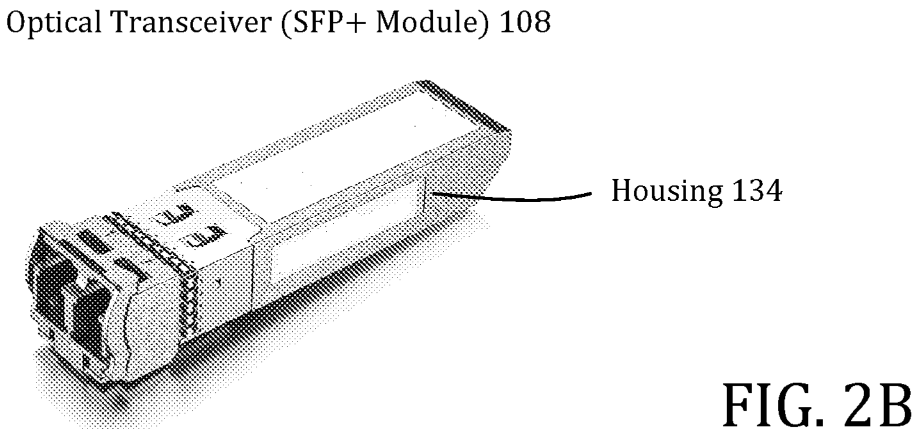
FIG. 2B is a grey-scale image of an optical transceiver used in the laser system of FIG. 1.

As shown in FIG. 2B, optical transceiver 108 can be a "small form-factor pluggable" (SFP) or an "enhanced small form-factor pluggable (SFP+) device. SFP and SFP+ have the same size and appearance. The main difference between SFP and SFP+ is that the SFP+ is used in Gigabit Ethernet applications while SFP is for 100Base or 1000Base applications. For comparison purposes, a D2-260 Beat Note Detector (available from Vescent) is about an order of magnitude larger and more costly and "is not suitable for measuring optical power or other amplitude characteristics due to the digitized output" (Vescent product page).

The range of frequencies that an optical transceiver can convert is a constraint on beat-note frequencies. For example, optical transceiver 108 can convert optical beat-notes with beat-note frequencies up to about 20 gigahertz. This constraint then requires that the reference frequency be within 20 gigahertz of the monitor frequency $f_1(t)$. Thus, the tuning range can be limited to 20 gigahertz given a fixed reference frequency. Such a range is ample for certain applications, e.g., involving on or near resonance interactions with cold atoms, e.g., for quantum computing and quantum sensors. For other applications requiring a wider tuning range, the reference frequency can be selectable to achieve a beat-note the optical transceiver can convert. For example, frequency reference 104 can include a frequency comb that provides a series of reference frequencies that can be selected. Alternatively or in addition, the relationship between the system output signal and the monitor signal can be selectable so that the monitor signal can be matched (e.g., to within 20 gigahertz) to an available reference frequency.

Figure 3:
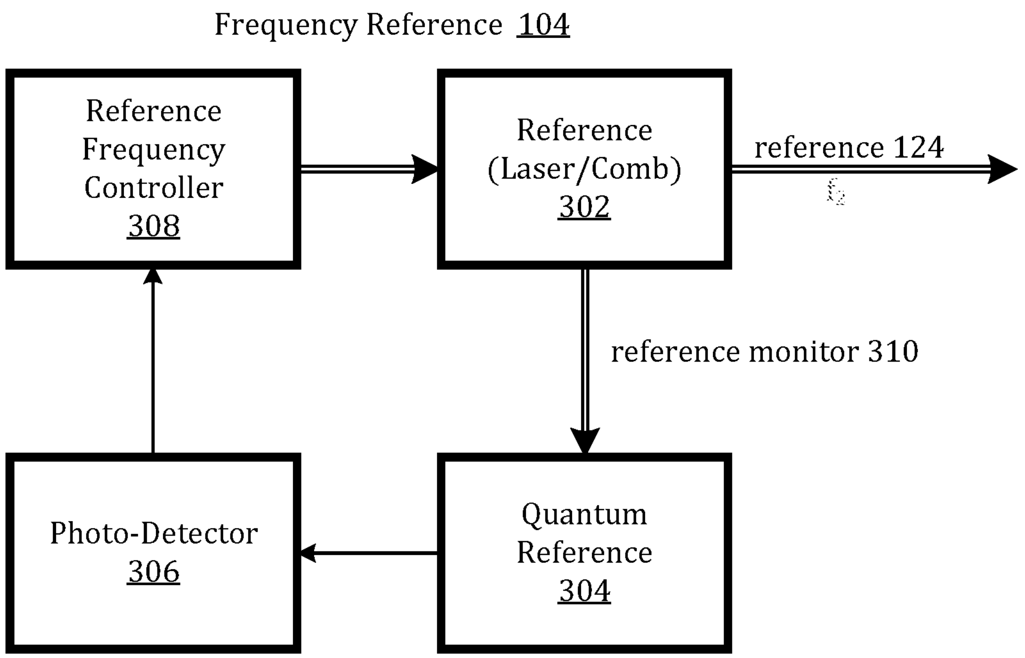
FIG. 3 is a schematic illustration of a frequency reference of the beat-note stabilized laser system of FIG. 1.
Figure 4:
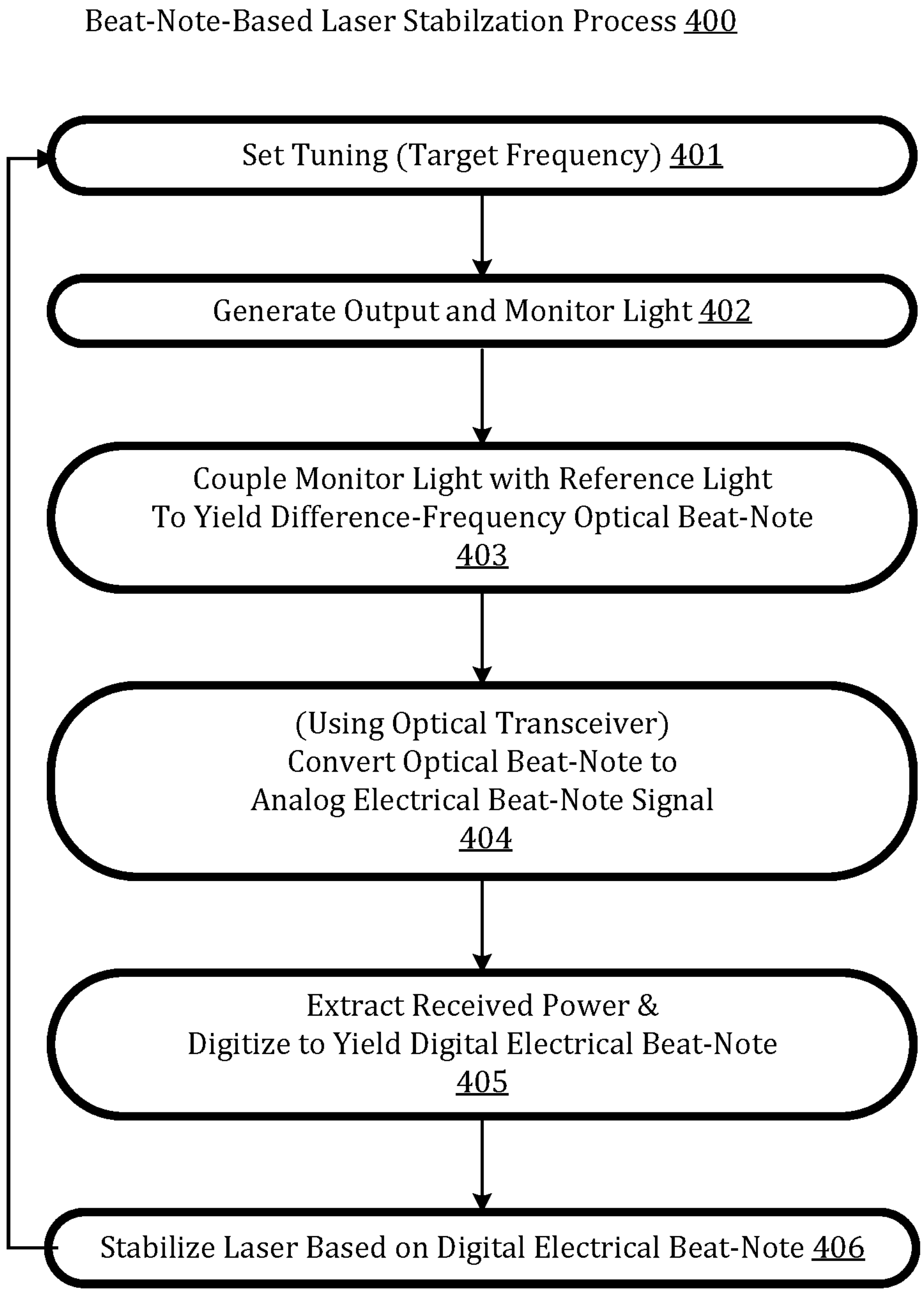
FIG. 4 is a flow chart of a beat-note stabilization process used in the system of FIG. 1.

Frequency reference 104, shown in greater detail in FIG. 3, includes a reference laser or frequency comb 302, a quantum reference 304, a photodetector 306, and a reference frequency controller 308. Reference laser/comb 302, outputs reference signal 124 with frequency $f_2$. In addition, reference laser/comb 302 outputs a reference monitor signal 310 which can have frequency $f_2$ or a frequency with a known relation to frequency $f_2$. For example, reference monitor signal 304 can be sourced from a different tooth of a comb than the one used to source reference signal 124. Alternatively, an acousto-optical modulator (AOM) or an electro-optical modulator (EOM) can be used to frequency shift a signal split from reference signal 124 to yield a reference monitor signal of a different frequency. In any event, the frequency of reference monitor signal 304 is selected to match a resonance transition for a quantum reference 304. Quantum reference 304 can be, for example, a vapor of rubidium 87 atoms or other atoms or other molecular entities.

When the reference monitor frequency matches the resonance frequency of quantum reference 306, quantum reference 306 emits fluorescence at a maximum intensity. To the extent that reference monitor frequency 304 differs from the reference frequency, the fluorescence decreases. Photodetector 308 tracks the fluorescence and provides a corresponding electrical signal to reference frequency controller 310, which adjusts a reference frequency setting to compensate for any mismatch of the reference monitor frequency to the quantum reference resonance frequency. Extending this approach to a tunable laser can be challenging as it requires matching and utilizing multiple resonance frequencies of a reference population. Accordingly, in the case of a tunable laser, the beat-note approach can be more cost-effective.

A beat-note-based laser stabilization process 400, flow charted in FIG. 1, can be implemented using tunable laser system 100 (FIG. 1) or another laser system. At 401, a target frequency for the tunable laser can be checked, set, or adjusted. At 402, system output light and monitor light are transmitted. The system output light has an output frequency nominally equal to the set frequency, while the monitor light has the same frequency as the output light or at least has a known phase or frequency relationship with the output light. At 403, the monitor light is combined with reference light to yield an optical beat-note. The frequency of the optical beat-note is equal to the absolute value of the difference between the monitor light frequency and the reference frequency. If, for example, the reference frequency is below the monitor light frequency, then the beat-note frequency is the monitor light frequency less the reference frequency. In effect, an optical coupler down-converts optical frequencies in the hundreds of Terahertz range to frequencies manageable by electronics, e.g., in the 1 Megahertz to 20 Gigahertz range.

At 404, an optical transceiver converts the optical beat-note to an analog electrical beat-note. At 405, the analog electrical beat note is digitized to yield a digital electrical beat-note; in addition, a received-power is tracked based on the analog electrical beat-note. At 406, the tunable laser is phase or offset locked to the digital electrical beat-note. Also, at 406, electrical received-power data can be converted to optical received-power data and transmitted using a transmitter of the optical transceiver.

Telecom optical transceiver modules are often called "SFP modules", "fiber optic transceivers", "SFP transceiver module", "1000BASE-SX". Laser frequency stabilization systems are often called "laser phase lock", "laser phase controller", "laser frequency lock", "laser frequency controller", "laser offset lock", or "RF offset lock". Herein, an SFP or SFP+ module includes a housing that encloses active components, notwithstanding portions of a component, e.g., a photoreceptor, are exposed to connectors.

In the illustrated embodiment, the laser is stabilized using a mode-locking approach. In an alternative embodiment, a numerical approach is used. For example, a beat-note frequency can be extracted from the electrical beat-note signal. A known reference frequency of the reference signal can be added to the beat-note frequency to obtain the frequency of the monitor signal. Since the frequency relationship between the output signal and the monitor signal is typically known, this relationship can be used to determine the output frequency. The determined output frequency can be compared with a nominally set target frequency to yield a frequency error on which a frequency adjustment can be based.

Herein, a "tunable laser" is a laser whose output frequency can be controlled or programmed. In the illustrated embodiment, the tuned-frequency controller is used to monitor received-power and temperature. In other embodiments, it is used to track other parameters. In another embodiment, the frequency controller is used exclusively for mode (phase/frequency) locking and the tracking functions are performed by another module or not at all. In the illustrated embodiment, the transmitter of the optical transceiver is used to transmit power-received and temperature data. In some other embodiments, the transmitter is used for other purposes. In still other embodiments, it is left idle.

Herein, the reference laser subsystem employs a quantum reference populated by atoms. Other embodiments use a quantum reference populated by other molecular entities. A "molecular entity" is "any constitutionally or isotopically distinct atom, molecule, ion, ion pair, radical, radical ion, complex, conformer, etc., identifiable as a separately distinguishable entity". In still other embodiments, non-quantum-based laser stabilization approaches, such as mode locking, are used to stabilize the reference laser subsystem.

Herein, all art labeled "prior art" is admitted prior art; all art not labeled "prior art" is not admitted prior art. The illustrated embodiments as well as variations thereupon and modifications thereto are provided for by the present invention, the scope of which is defined by the accompanying claims.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A laser system comprising:

a laser subsystem having a system optical output to be frequency stabilized and a monitor optical output having a predetermined relationship with the system optical output;

a frequency reference for providing an optical reference having a reference frequency, the frequency reference comprising:

a quantum reference;

a reference laser for directing a reference monitor signal onto the quantum reference, and for providing the optical reference having a reference frequency;

a photodetector for tracking fluorescence emitted by the quantum reference and producing a corresponding electrical signal; and a reference frequency controller for receiving the electrical signal from the photodetector and adjusting the reference frequency of the optical reference based on the electrical signal;

an optical coupler for coupling the monitor optical output and the optical reference to yield an optical beat-note;

a beat-note detector including:

a photodetector for converting the optical beat-note to an analog electrical beat-note;

a digitizer for converting the analog electrical beat-note to a digital electrical beat-note;

a received-power tracker for extracting received-power data from the analog electrical beat-note, the received-power data corresponding to optical power received by the photodetector; and a housing enclosing each of the photodetector, the digitizer, and the received-power tracker; and a frequency controller for regulating a frequency of the system optical output based on the digital electrical beat-notes.

2. The laser system of claim 1 wherein the beat-note detector is a small form-factor pluggable (SFP) or an enhanced small form-factor pluggable (SFP+) device.

3. The laser system of claim 1 wherein the predetermined relationship is a phase or frequency relationship.

4. The laser system as recited in claim 1 wherein the laser subsystem can be tuned so that the system optical output can be stabilized at frequencies of a range over at least 1 Gigahertz.

5. The laser system as recited in claim 1 wherein the frequency reference includes a frequency comb.

6. The laser system of claim 5 further comprising a reference frequency selector for selecting different reference frequencies of the frequency comb.

7. The laser system of claim 1 wherein the beat-note detector includes an optical transmitter that is at least partially enclosed by the housing.

8. The laser system of claim 7 wherein the optical transmitter is configured to transmit optical data representing the optical power received by the photodetector.

9. A laser stabilization process comprising:

generating, using a laser, an output signal and a monitor signal having a predetermined relationship with the output signal;

directing a reference monitor signal generated by a reference laser onto a quantum reference;

tracking, in response to directing the reference monitor signal onto the quantum reference, fluorescence emitted by the quantum reference using a photodetector to produce a corresponding electrical signal;

receiving, using a reference frequency controller, the electrical signal;

generating, by the reference laser, an optical reference signal based on the electrical signal;

coupling the monitor signal with the optical reference signal to yield an optical beat-note;

converting the optical beat-note to an analog electrical beat-note;

extracting, from the analog electrical beat-note, power-received data regarding optical power received from the optical beat-note;

digitizing the analog electrical beat-note to yield a digital electrical beat-note; and frequency stabilizing the output signal based on the digital electrical beat-note.

10. The laser stabilization process of claim 9 wherein the converting, extracting, and digitizing are performed using a small form-factor pluggable (SFP) or an enhanced small form-factor pluggable (SFP+) device.

11. The laser stabilization process of claim 9 wherein the frequency stabilizing includes digital phase or offset locking the laser.

12. The laser stabilization process of claim 9 further comprising tuning the laser so that the output signal varies over an at least 1 gigahertz range.

* * * * *